7425X
B. MORISON.
BALANCE.
Patented Feb. 13, 1833.
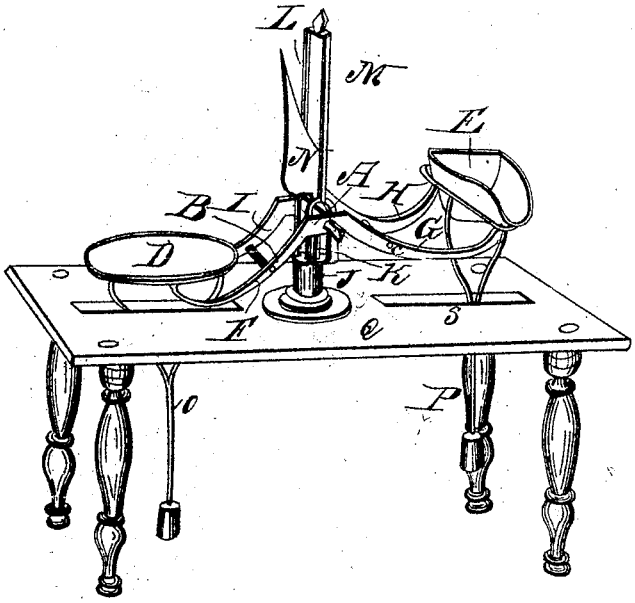

missing
page